Patented Apr. 12, 1927.

1,624,600

UNITED STATES PATENT OFFICE.

THOMAS G. HITT, OF SEATTLE, WASHINGTON.

COLORED-VAPOR SIGNAL.

No Drawing.   Application filed December 24, 1926.  Serial No. 156,999.

This application is a continuation in part of my copending application Serial Number 7711, filed February 7, 1925.

The invention forming the subject matter of this application and my aforesaid copending application, relates to method and means adapted to produce masses of intensely colored clouds of sprays for signaling purposes or for use in pyrotechnic displays.

The object of the invention is to provide means adapted to dissolve or suspend coloring matter in such form that when the solution or suspensoid is spread out in the atmosphere in the form of an attenuated spray a highly colored transparent cloud of vapor is formed which is adapted to be used for signaling or pyrotechnic displays.

The main objection to ordinary smoke clouds such as have been used heretofore, for signaling purposes, is that the solid particles of coloring matter form the cloud itself and therefore show color by reflected light only, the specific color effect disappearing when viewed by transmitted light.

In order to ensure a display of color at all times in vapor clouds I have devised the present method and means for holding the coloring matter in solution or suspension so that when the solution or suspensoid is sprayed out in the form of a tenuous vapor cloud, the coloring matter in solution or suspension gives a distinct color to the cloud by either transmitted or reflected lights.

To produce the required colored vapor signals, I have found it preferable to utilize as a base, a liquid such as titanium tetrachloride ($TiCl_4$), which is capable of holding suitable coloring matter in solution or colloidal suspension and which fumes readily when exposed to moist air. Of coloring matters which dissolve in titanium tetrachloride, safranin and auramin are examples; the former imparting a red color to the colorless titanium tetrachloride, while the auramin gives it a yellow color, the color intensities depending upon the relative proportions of solution and solute.

Quicksilver vermilion ($HgS$) cadmium yellow ($CdS$) antimony orange ($Sb_2S_3$) ultramarine blue and Brunswick green, may be taken as examples of coloring substances adapted to be finely suspended in the titanium tetrachloride to produce vapor clouds colored according to the coloring substance or substances used.

The various color substances may be dissolved or suspended in any desired manner. The safranin or auramin or other soluble color may be first dissolved in the titanium tetrachloride, and the solution may then be sprayed from any suitable container to form the color cloud desired. So, too, the suspensive colors may be first mechanically beaten or mixed in fine suspension in the titanium tetrachloride and the resulting mixture sprayed from a suitable container to form the desired colored cloud.

The titanium tetrachloride and the color substance or substances may be secured in separate containers to a rocket detonator device, similar to that disclosed in applicant's U. S. Patent #1,253,593, and the containers exploded to cause mixture of the contents thereof and thereby effect the solution or suspension simultaneously with the formation of the color cloud.

The color clouds may also be formed by forcing the liquid tetrachloride into the air in a fine spray and by spraying the coloring matter against this liquid spray of titanium tetrachloride. Any suitable apparatus may be used for the purpose.

However produced, the vapor cloud is a colored gelatinous vapor of titanium tetrachloride with coloring matter either dissolved or finely suspended therein. In other words, the vapor cloud formed by this invention is a tenuous transparent screen of liquid vapor having coloring matter dissolved or finely suspended therein, and therefore exhibiting color by either reflected or transmitted light.

The invention is not to be considered as limited to any particular color or combination of colors. While titanium tetrachloride is a colorless liquid, some of the color substances dissolved or suspended therein may change color or lose some of it. This, however, will have no effect on the broad inventive idea, as the color resulting from the solution or suspension will be the color of the vapor cloud formed therefrom.

This final color of the vapor cloud can be readily predetermined by utilizing the ingredients necessary to produce that color. The titanium tetrachloride fumes readily when exposed to moist air, and the colored solution or suspensoid when sprayed, as previously described, into the atmosphere form a transparent colored vapor mixture of titanium hydroxide hydrochloric acid and coloring matter.

Having thus described my invention, what I claim is:—

1. The method of producing transparent colored clouds of vapor which consists in spraying titanium tetrachloride into the atmosphere and spraying coloring matter into the sprayed tetrachloride to form therewith a transparent colored screen of vapor.

2. The method of producing transparent colored clouds of vapor which consists in simultaneously spraying titanium tetrachloride and coloring matter into the atmosphere and causing the sprays to mix and form a transparent colored screen of vapor.

3. The method of producing transparent colored clouds of vapor which consists in dissolving coloring matter in titanium tetrachloride, and spraying the solution into the atmosphere.

4. The method of producing transparent colored clouds of vapor which consists in mixing coloring matter with titanium tetrachloride and spraying the mixture into the atmosphere.

5. A colored transparent gelatinous vapor formed of titanium hydroxide, hydrochloric acid, and coloring matter.

6. A colored transparent vapor signal formed by spraying into moist air a liquid which fumes readily in moist air and has coloring matter intimately mixed therewith.

In testimony whereof I affix my signature.

THOMAS G. HITT.